US012559610B2

(12) United States Patent
Senga et al.

(10) Patent No.: US 12,559,610 B2
(45) Date of Patent: Feb. 24, 2026

(54) AROMATIC POLYETHER, AROMATIC POLYETHER COMPOSITION, SHEET AND METHOD FOR PRODUCING AROMATIC POLYETHER

(71) Applicant: IDEMITSU KOSAN CO., LTD., Tokyo (JP)

(72) Inventors: Minoru Senga, Sodegaura (JP); Kouichi Suga, Sodegaura (JP); Yuko Murakami, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 934 days.

(21) Appl. No.: 17/782,991

(22) PCT Filed: Dec. 10, 2020

(86) PCT No.: PCT/JP2020/046065

§ 371 (c)(1),
(2) Date: Jun. 6, 2022

(87) PCT Pub. No.: WO2021/117814

PCT Pub. Date: Jun. 17, 2021

(65) Prior Publication Data

US 2023/0029776 A1 Feb. 2, 2023

(30) Foreign Application Priority Data

Dec. 12, 2019 (JP) ................................ 2019-224564

(51) Int. Cl.
*C08K 7/14* (2006.01)

(52) U.S. Cl.
CPC ..................................... *C08K 7/14* (2013.01)

(58) Field of Classification Search
CPC ......... C08G 65/4018; C08J 5/18; C08J 5/243; C08J 2371/10
See application file for complete search history.

(56) References Cited

U.S. PATENT DOCUMENTS

| | | | | |
|---|---|---|---|---|
| 5,115,077 | A | 5/1992 | Matsuo et al. | |
| 2004/0170554 | A1* | 9/2004 | Wadahara | B32B 5/024 423/447.2 |
| 2019/0322804 | A1 | 10/2019 | Louis et al. | |

FOREIGN PATENT DOCUMENTS

| | | | |
|---|---|---|---|
| CN | 102532516 | A | 7/2012 |
| CN | 110177823 | A | 8/2019 |
| JP | H02-255833 | A | 10/1990 |
| JP | H03-181519 | A | 8/1991 |
| JP | 2019-509379 | A | 4/2019 |
| JP | 2019-533755 | A | 11/2019 |

OTHER PUBLICATIONS

English translation of JPH03181519 (Year: 1991).*
Office Action issued in connection with Chinese Appl. No. 202080083406.4 dated Nov. 7, 2023.
International Search Report issued in corresponding International Patent Application No. PCT/JP2020/046065 dated Feb. 16, 2021.
Translation of Written Opinion (International Preliminary Report on Patentability) issued in corresponding International Patent Application No. PCT/JP2020/046065 dated Feb. 16, 2021.

* cited by examiner

*Primary Examiner* — Catherine S Branch
*Assistant Examiner* — Andrea Wu
(74) *Attorney, Agent, or Firm* — Foley & Lardner LLP

(57) ABSTRACT

An aromatic polyether including structural units represented by the following formulas (1A) to (4A):

(1A)

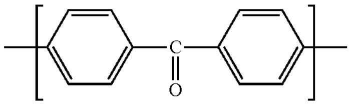

(2A)

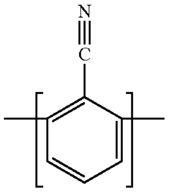

(3A)

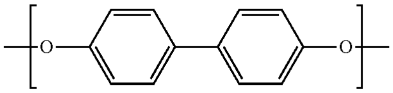

(4A)

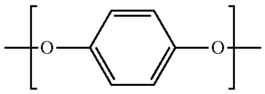

12 Claims, No Drawings

AROMATIC POLYETHER, AROMATIC POLYETHER COMPOSITION, SHEET AND METHOD FOR PRODUCING AROMATIC POLYETHER

CROSS-REFERENCE TO RELATED APPLICATIONS

The present application claims priority under 37 U.S.C. § 371 to International Patent Application No. PCT/JP2020/046065, filed Dec. 10, 2020, which claims priority to and the benefit of Japanese Patent Application No. 2019-224564, filed on Dec. 12, 2019. The contents of these applications are hereby incorporated by reference in their entireties.

TECHNICAL FIELD

The present invention relates to an aromatic polyether capable of exhibiting excellent mechanical strength by containing a filler, an aromatic polyether composition, a sheet and a method for producing an aromatic polyether.

BACKGROUND ART

As a typical aromatic polyether, polyether ether ketone (PEEK) is known.

Further, an aromatic polyether having a specific structure disclosed in Patent Document 1 (hereinafter, also referred to as "aromatic polyether A'") tends to have a higher glass transition temperature (Tg) than a PEEK, and is excellent in heat resistance.

RELATED ART DOCUMENTS

Patent Documents

[Patent Document 1] JP-A-H2-255833

SUMMARY OF THE INVENTION

In the aromatic polyether A' of Patent Document 1, possibility for further improvement has been found from the viewpoint of further improving the mechanical strength in the case of containing a filler such as glass fiber or the like.

It is an object of the present invention to provide an aromatic polyether which can exhibit excellent mechanical strength by containing a filler, an aromatic polyether composition, a sheet and a method for producing an aromatic polyether.

According to the invention, the following aromatic polyether or the like are provided.

1. An aromatic polyether comprising structural units represented by the following formulas (1A) to (4A):

(1A)

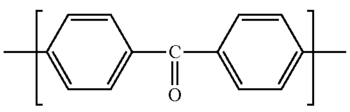

(2A)

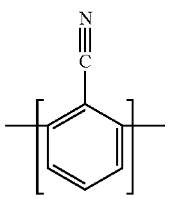

-continued (3A)

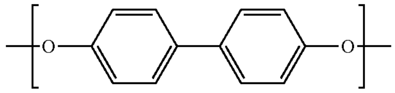

(4A)

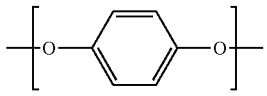

2. The aromatic polyether according to 1, wherein a molar ratio ([1A]:[2A]) of the structural unit represented by the formula (1A) and the structural unit represented by the formula (2A) is 99:1 to 1:99.

3. The aromatic polyether according to 1 or 2, wherein a molar ratio ([3A]:[4A]) of the structural unit represented by the formula (3A) and the structural unit represented by the formula (4A) is 99:1 to 1:99.

4. The aromatic polyether according to any one of 1 to 3, wherein the melt flow rate is 0.2 to 110 g/10 min.

5. An aromatic polyether composition comprising an aromatic polyether according to any one of 1 to 4.

6. The aromatic polyether composition according to 5, which comprises a filler.

7. The aromatic polyether composition according to 6, wherein the filler is one or more selected from the group consisting of a glass fiber, a carbon fiber and a boron nitride.

8. The aromatic polyether composition according to 6 or 7, wherein the filler is a glass fiber.

9. A sheet comprising a cloth and the aromatic polyether according to any one of 1 to 4 impregnated into the cloth.

10. The sheet according to 9, wherein the cloth is a unidirectional member.

11. The sheet according to 9 or 10, wherein the cloth comprises one or more selected from the group consisting of a glass fiber and a carbon fiber.

12. A method for producing an aromatic polyether comprising reacting compounds represented by the following formulas (1B) to (4B):

(1B)

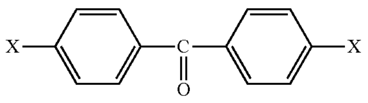

(2B)

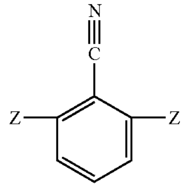

(3B)

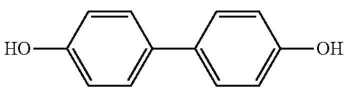

(4B)

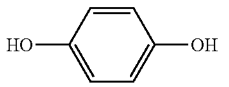

wherein in the formula (1B), X represents a halogen atom, the two X's are the same as or different from each other; in the formula (2B), Z represents a halogen atom, the two Z's are the same as or different from each other.

According to the present invention, there can be provided an aromatic polyether which can exhibit excellent mechanical strength by containing a filler, an aromatic polyether composition, a sheet and a method for producing an aromatic polyether.

MODE FOR CARRYING OUT THE INVENTION

Hereinafter, a mode for carrying out the invention will be described. It should be noted that an embodiment in which two or more individual preferred embodiments of the present invention described below are combined is also a preferred embodiment of the present invention.

(Aromatic Polyether)

The aromatic polyether according to an aspect of the present disclosure (hereinafter also referred to as "aromatic polyether A") includes structural units (hereinafter also referred to as "repeating units") represented by the following formulas (1A) to (4A).

(1A)

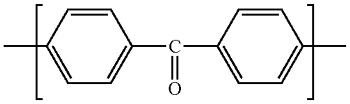

(2A)

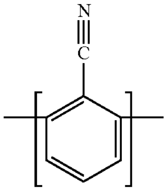

(3A)

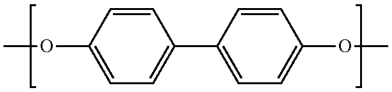

(4A)

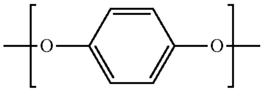

The aromatic polyether A can exhibit excellent mechanical strength (e.g., tensile strength) by containing a filler.

The aromatic polyether A' of Patent Document 1 includes structural units represented by the formulas (1A) to (3A), but does not include a structural unit represented by the formula (4A). The aromatic polyether A according to one embodiment of the present aspect can improve the tensile strength in the case of containing the filler as compared with the aromatic polyether A'. In the aromatic polyether A according to one embodiment of the present aspect, a part of the structural unit represented by the formula (3A) in the aromatic polyether A' is replaced with the structural unit represented by the formula (4A), so that the tensile strength in the case of containing the filler can be improved as compared with the aromatic polyetherA'.

In the aromatic polyetherA, a molar ratio ([1A]:[2A]) of a structural unit represented by the formula (1A) and a structural unit represented by the formula (2A) is not particularly limited.

In one embodiment, the molar ratio ([1A]:[2A]) is 99:1 to 1:99.

The molar ratio ([1A]:[2A]) is preferably from 60:40 to 80:20. As a result, the obtained aromatic polyether A exhibits its excellent crystallinity and is prevented from excessively increasing the melting point (Tm).

When the proportion of the structural unit represented by the formula (2A) is 40 mol % or less based on the total amount of the structural unit represented by the formula (1A) and the structural unit represented by the formula (2A), the obtained aromatic polyether A exhibits excellent crystallinity. When the proportion of the structural unit represented by the formula (2A) is 20 mol % or more based on the total amount of the structural unit represented by the formula (1A) and the structural unit represented by the formula (2A), it is prevented that the melting point (Tm) of the obtained aromatic polyetherA is excessively increased.

In the aromatic polyether A, a molar ratio ([3A]:[4A]) of a structural unit represented by the formula (3A) and a structural unit represented by the formula (4A) is not particularly limited.

In one embodiment, the molar ratio ([3A]:[4A]) is 99:1 to 1:99.

The molar ratio ([3A]:[4A]) is preferably 95:5 to 75:25. As a result, the obtained aromatic polyetherA exhibits excellent crystallinity.

In the aromatic polyetherA, the molar ratio ([1A]+[2A]:[3A]+[4A]) of the total amount of the structural unit represented by the formula (1A) and the structural unit represented by the formula (2A) and the total amount of the structural unit represented by the formula (3A) and the structural unit represented by the formula (4A) is not particularly limited.

In one embodiment, the molar ratio ([1A]+[2A]:[3A]+[4A]) is 47:53 to 53:47.

The molar ratio ([1A]+[2A]:[3A]+[4A]) is preferably 48:52 to 52:48.

The number of mols of the total amount of the structural unit represented by the formula (1A) and the structural unit represented by the formula (2A) may be larger than, smaller than, or the same as the number of mols of the total amount of the structural unit represented by the formula (3A) and the structural unit represented by the formula (4A).

In the aromatic polyether A according to one embodiment, a structural unit represented by the formula (3A) or a structural unit represented by the formula (4A) is linked to a structural unit represented by the formula (1A).

In the aromatic polyether A according to one embodiment, a structural unit represented by the formula (3A) or a structural unit represented by the formula (4A) is linked to a structural unit represented by the formula (2A).

The aromatic polyether A according to one embodiment includes one or more of the structural units represented by the following formulas (5A) to (8A).

(5A)

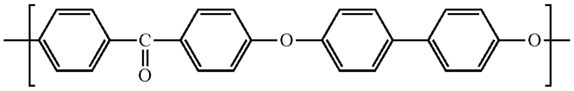

(6A)

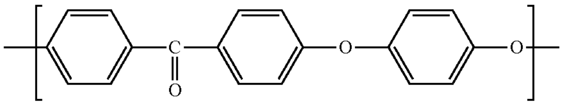

-continued (7A)

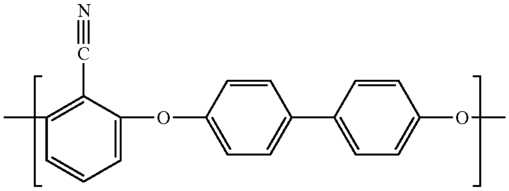

(8A)

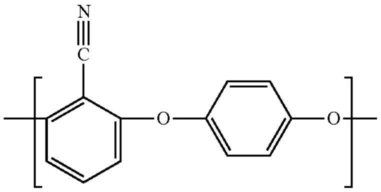

The structural unit represented by the formula (5A) is a structural unit composed of a connected body of the structural unit represented by the formula (1A) and the structural unit represented by the formula (3A).

The structural unit represented by the formula (6A) is a structural unit composed of a connected body of the structural unit represented by the formula (1A) and the structural unit represented by the formula (4A).

The structural unit represented by the formula (7A) is a structural unit composed of a connected body of the structural unit represented by the formula (2A) and the structural unit represented by the formula (3A).

The structural unit represented by the formula (8A) is a structural unit composed of a connected body of the structural unit represented by the formula (2A) and the structural unit represented by the formula (4A).

The aromatic polyether A according to one embodiment includes one or more of the structural units represented by the formulas (6A) and (8A).

The aromatic polyether A according to one embodiment includes the structural units represented by the formulas (5A) to (8A).

In an aromatic polyether A according to one embodiment, a structural unit represented by the formula (1A) or a structural unit represented by the formula (2A) is disposed at one or more ends of a molecular chain. In this case, the terminal structure bonded to the structural unit can be, for example, a halogen atom or the like. The halogen atom is not particularly limited, and may be, for example, F, Cl or the like.

In an aromatic polyether A according to one embodiment, a structural unit represented by the formula (3A) or a structural unit represented by the formula (4A) is disposed at one or more ends of a molecular chain. In this case, the terminal structure bonded to the structural unit can be, for example, H (when the terminal structure is H, a hydroxyl group can be formed with O in the structural unit).

The terminal structure of the aromatic polyether A may be, for example, a structure in which the halogen atom or the hydroxyl group described above is replaced with H or the like. The terminal structure is not limited to these examples, and may be any structure.

In one embodiment, the aromatic polyether A does not include other structural units other than the structural units represented by the formulas (1A) to (4A). However, the terminal of the molecular chain may have a terminal structure as described above.

In one embodiment, the aromatic polyether A includes other structural units other than the structural units represented by the formulas (1A) to (4A), as long as the effects of the present invention are not impaired.

In one embodiment, the melt flow rate (MFR) of the aromatic polyether A is 0.2 g/10 min or more, 1 g/10 min or more, or 2 g/10 min or more, and is also 110 g/10 min or less, 70 g/10 min or less, or 60 g/10 min or less. The upper limit and the lower limit can be arbitrarily combined.

Further, in one embodiment, the melt flow rate (MFR) of the aromatic polyether A is preferably 0.2 g/10 min or more and 110 g/10 min or less, more preferably 1 g/10 min or more and 70 g/10 min or less, and most preferably 2 g/10 min or more and 60 g/10 min or less. As a result, effects can be obtained in which the aromatic polyether A can be brought into a viscosity range suitable for extrusion molding, injection molding and the like.

The melt flow rate (MFR) of the aromatic polyether A is a value measured by the method described in the Examples.

In one embodiment, the glass transition temperature (Tg) of the aromatic polyether A is 170° C. or more or 173° C. or more, and is 180° C. or less or 177° C. or less. The upper limit and the lower limit can be arbitrarily combined. As a result, the aromatic polyether A exhibits excellent heat resistance, particularly excellent long-term heat resistance.

In one embodiment, the melting point (Tm) of the aromatic polyether A is 330° C. or more, 340° C. or more, or 350° C. or more, and is also 390° C. or less, 380° C. or less, or 370° C. or less. The upper limit and the lower limit can be arbitrarily combined. As a result, the aromatic polyether A exhibits excellent heat resistance and moldability, particularly excellent short-term heat resistance.

The "long-term heat resistance" generally means a property that is difficult to be thermally deformed on a scale of several tens of thousands to a hundred thousand hours, and can correspond to the thermal deformation prevention property when the product is used for a long period of time. The "short-term heat resistance" generally means a property that is difficult to deform on a scale of several minutes to several hours, and can correspond to the thermal deformation prevention property when a temporary load is applied to the product.

In one embodiment, the crystallization temperature (Tc) of the aromatic polyether A is 220° C. or more, 230° C. or more, or 240° C. or more, and is 310° C. or less, 300° C. or less, or 290° C. or less. The upper limit and the lower limit can be arbitrarily combined. As a result, an effect that the crystallization rate can be controlled can be obtained.

The glass transition temperature (Tg), the melting point (Tm) and the crystallization temperature (Tc) of the aromatic polyether A are values measured by using the method described in the Examples.

In one embodiment, the difference (Tm-Tc) between the melting point (Tm) and the crystallization temperature (Tc) of the aromatic polyether A is 40° C. or more, 45° C. or more, 50° C. or more, 55° C. or more, or 60° C. or more. The upper limit of the above-mentioned difference (Tm-Tc) is not particularly limited, and is, for example, 120° C. or less.

The aromatic polyether A in a solid state is heated to a temperature equal to or higher than the melting point (Tm), thereby being in a molten state. The aromatic polyether A in a molten state is cooled to a temperature equal to or lower than the crystallization temperature (Tc), thereby being in a solid state. Here, the larger the difference (Tc-Tm) between the crystallization temperature (Tc) and the melting temperature (Tm), the longer the molten state can be maintained in the process of cooling the aromatic polyether A in the molten state. As a result, in a molding method using a 3D printer or the like, a printing method, or the like, a plurality of elements (for example, dots) including the polyether A are sufficiently unified, and objects (printed matter, molded matter or the like) formed by these elements can be firmly integrated.

In one embodiment, the aromatic polyether A contains a halogen atom. In one embodiment, the aromatic polyether A contains one or more selected from the group consisting of Cl and F. The amount of Cl and F of the aromatic polyether A can be measured by using the method (combustion ion chromatography) described in the Examples, respectively. In this case, the amount of Cl and F includes not only Cl and F constituting the molecular structure of the aromatic polyether A but also Cl and F mixed in the aromatic polyether A (e.g., Cl and F derived from monomers remaining in the aromatic polyetherA).

In one embodiment, the Cl amount of the aromatic polyether A is 2 μmol/g or more, 30 μmol/g or more, or 40 μmol/g or more, and is 200 μmol/g or less, 180 μmol/g or less, or 150 μmol/g or less. The upper limit and the lower limit can be arbitrarily combined.

In one embodiment, the K amount of the aromatic polyether A is 0 μmol/g or more, 1 μmol/g or more, or 2 μmol/g or more, and is 50 μmol/g or less, 30 μmol/g or less, or 10 μmol/g or less. The upper limit and the lower limit can be arbitrarily combined. The K amount of the aromatic polyetherA is a value measured by using the method described in the Examples.

In one embodiment, as the difference (CI amount-K amount) between the Cl amount and the K amount in the aromatic polyether A is increased as a positive value, it is estimated that the proportion of the Cl bonded to the terminal of the aromatic polyether A is increased (the proportion of the Cl present as a salt with K is decreased), and the effect of the present invention is easily exhibited. The same applies to the difference between the F amount and the K amount (F amount-K amount) in the aromatic polyetherA.

In one embodiment, the difference (CI amount-K amount) described above may be 2 μmol/g or more, 30 μmol/g or more, or 40 μmol/g or more, and may be 200 μmol/g or less, 180 μmol/g or less, or 150 μmol/g or less. The upper limit and the lower limit can be arbitrarily combined.

(Method for Producing Aromatic Polyether)

A method for producing an aromatic polyether according to an aspect of the present invention includes reacting a compound represented by the following formula (1B) to (4B):

(1B)

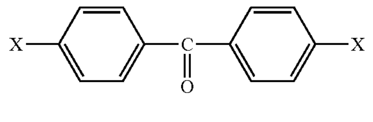

(2B)

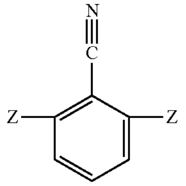

(3B)

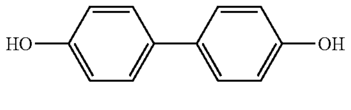

-continued (4B)

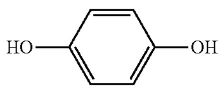

wherein in the formula (1B), X represents a halogen atom, the two X's are the same as or different from each other; in the formula (2B), Z represents a halogen atom, the two Z's are the same as or different from each other.

The compounds represented by the formulas (1B) to (4B) are a monomer for polymerization of an aromatic polyether A.

Through the step of reacting the compounds represented by the formulas (1B) to (4B), an aromatic polyetherA can be obtained as a copolymer of these compounds (monomer units).

In the formula (1B), a halogen atom represented by X is not particularly limited, and may be, for example, F, Cl or the like.

In one embodiment, as a compound represented by the formula (1B), a compound in which two X's are Cl is used at least.

In one embodiment, based on the total amount of the compound represented by the formula (1B), the proportion of the compound in which the two X's are Cl is, for example, 50 mol % or more, 60 mol % or more, 70 mol % or more, 80 mol % or more, 90 mol % or more, 95 mol % or more, 97 mol % or more, 99 mol % or more, 99.5 mol % or more, or 100 mol %.

In the formula (2B), a halogen atom represented by Z is not particularly limited, and may be, for example, F, Cl or the like.

In one embodiment, as a compound represented by the formula (2B), a compound in which two Z's are Cl is used at least.

In one embodiment, based on the total amount of the compound represented by the formula (2B), the proportion of the compound in which the two Z's are Cl is, for example, 50 mol % or more, 60 mol % or more, 70 mol % or more, 80 mol % or more, 90 mol % or more, 95 mol % or more, 97 mol % or more, 99 mol % or more, 99.5 mol % or more, or 100 mol %.

When the proportion of the compound in which the two X's are Cl, based on the total amount of the compound represented by formula (1B), and the proportion of the compound in which the two Z's are Cl, based on the total amount of the compound represented by formula (2B) are increased, the difference (Tm-Tc) between the melting point (Tm) and the crystallization temperature (Tc) of the obtained aromatic polyether A is increased, and the molten state can be maintained for a long time in the cooling process from the molten state.

The compounds represented by the formulas (1B) to (4B) can be easily synthesized and are also available as a commercial product.

The molar ratio ([1B]:[2B]) of the compound represented by the formula (1B) to be used in the reaction and the compound represented by the formula (2B) is not particularly limited.

In one embodiment, the molar ratio ([1B]:[2B]) is 99:1 to 1:99.

The molar ratio ([1B]:[2B]) is preferably 60:40 to 80:20. As a result, the obtained aromatic polyether A exhibits excellent crystallinity and is prevented from being excessively increased in melting point.

When the proportion of the compound represented by the formula (2B) is 40 mol % or less based on the total amount of the compound represented by the formula (1B) and the compound represented by the formula (2B), the obtained aromatic polyether A exhibits excellent crystallinity. When the proportion of the compound represented by the formula (2B) is 20 mol % or more based on the total amount of the compound represented by the formula (1B) and the compound represented by the formula (2B), it is prevented that the melting point of the obtained aromatic polyether A is excessively increased.

The molar ratio ([3B]:[4B]) of the compound represented by the formula (3B) to be used in the reaction and the compound represented by the formula (4B) is not particularly limited.

In one embodiment, the molar ratio ([3B]:[4B]) is 99:1 to 1:99.

The molar ratio ([3B]:[4B]) is preferably 95:5 to 75:25. As a result, the obtained aromatic polyetherA exhibits excellent crystallinity.

The molar ratio ([1B]+[2B]:[3B]+[4B]) of the total amount of the compound represented by the formula (1B) and the compound represented by the formula (2B) to be used in the reaction and the total amount of the compound represented by the formula (3B) and the compound represented by the formula (4B) is not particularly limited. The molar ratio ([1B]+[2B]:[3B]+[4B]) can be appropriately adjusted for the purpose of controlling the molecular weight of the obtained aromatic polyetherA, and the like.

In one embodiment, the molar ratio ([1B]+[2B]:[3B]+[4B]) is 47:53 to 53:47.

The molar ratio ([1B]+[2B]:[3B]+[4B]) is preferably 48:52 to 52:48. As a result, the obtained aromatic polyether A can be controlled to have the molecular weight exhibiting fluidity suitable for molding.

The number of mols of the total amount of the compound represented by the formula (1B) and the compound represented by the formula (2B) may be larger than, smaller than, or the same as the number of mols of the total amount of the compound represented by the formula (3B) and the compound represented by the formula (4B).

In one embodiment, the number of mols of the total amount of the compound represented by the formula (1B) and the compound represented by the formula (2B) is be larger than, smaller than, or the same as the number of mols of the total amount of the compound represented by the formula (3B) and the compound represented by the formula (4B).

In one embodiment, the compounds represented by the formulas (1B) to (4B) are reacted in a solvent.

The solvent is not particularly limited, and for example, a neutral polar solvent can be used. As neutral polar solvents, for example, N,N-dimethylformamide, N,N-diethylformamide, N,N-dimethylacetamide, N,N-diethylacetamide, N,N-dipropylacetamide, N,N-dimethylbenzoic acid amide, N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethyl sulfoxide, diethyl sulfoxide, 1-methyl-1-oxosulfolane, 1-ethyl-1-oxosulfolane, 1-phenyl-1-oxosulfolane, N,N'-dimethylimidazolidinone and diphenylsulfone can be given.

The concentration (blending amount basis) of the total amount of the compounds represented by the formulas (1B) to (4B) in the solvent is not particularly limited, and can be, for example, 1.0 mol/kg or more, 2.0 mol/kg or more or 3.0 mol/kg or more, and can also be 5.5 mol/kg or less, 5.0 mol/kg or less or 4.5 mol/kg or less. The upper limit and the lower limit can be arbitrarily combined.

The higher the concentration, the higher the amount of aromatic polyether A production is. As the concentration is lower, precipitation during polymerization can be prevented and the aromatic polyetherA is suitably extended to have the target molecular weight thereof.

When a solvent is used as described above, the reaction can be promoted by adding an alkaline to the solvent (reaction system).

The alkaline is not particularly limited, and examples thereof include an alkali metal carbonate and an alkali metal bicarbonate.

Examples of the alkali metal carbonate include lithium carbonate, sodium carbonate, potassium carbonate, rubidium carbonate, cesium carbonate and the like.

Examples of the alkali metal bicarbonate include lithium bicarbonate, sodium bicarbonate, potassium bicarbonate, rubidium bicarbonate, cesium bicarbonate, and the like.

The alkaline may be used alone, or two or more kinds thereof may be used in combination.

As the alkaline, for example, potassium Carbonate, a mixture of potassium carbonate and sodium carbonate can be preferably used.

Since dehydration is involved with the reaction of the compounds represented by the formulas (1B) to (4B), it may be reacted in the presence of an azeotrope in the case that a solvent is used as described above. The azeotrope is not particularly limited, and examples thereof include toluene and the like.

The reaction of the compounds represented by the formulas (1B) to (4B) can be conducted under an inert gas atmosphere. The inert gas is not particularly limited, and examples thereof include nitrogen, argon gas and the like.

The reaction of the compounds represented by the formulas (1B) to (4B) can be conducted in a heat treatment. The reaction temperature may be usually 150 to 380° C., preferably 180 to 350° C. Also, the reaction time may be usually 0.1 to 10 hours, preferably 1 to 5 hours.

After completion of the reaction of the compounds represented by the formulas (1B) to (4B), the generated aromatic polyether A can be separated, washed or purified in a conventional method.

In one embodiment, no other monomer other than the compounds represented by the formulas (1B) to (4B) is used as the monomer used in the above-described reaction.

In one embodiment, other monomers other than the compounds represented by the formulas (1B) to (4B) are used in combination in the above-described reaction, as long as the effects of the present invention are not impaired.

In one embodiment, the proportion (% by mass) of the total amount of the compounds represented by the formulas (1B) to (4B) based on the total monomer used in the reaction is 50% by mass or more, 60% by mass or more, 70% by mass or more, 80% by mass or more, 90% by mass or more, 95% by mass or more, 97% by mass or more, 99% by mass or more, 99.5% by mass or more, or 100% by mass.

In one embodiment, the proportion (% by mass) of the total structural units represented by the formulas (1A) to (4A) contained in all monomers based on the total monomer used in the reaction is 50% by mass or more, 60% by mass or more, 70% by mass or more, 80% by mass or more, 90% by mass or more, 95% by mass or more, 97% by mass or more, 99% by mass or more, 99.5% by mass or more, or 100% by mass.

The reaction of the compounds represented by the formulas (1B) to (4B) may be completed in one step, and may be completed in two or more steps. When the reaction is conducted in two or more steps, for example, a part of the total monomer used in the reaction may be reacted to form a prepolymer, and then the remaining monomer may be added to the prepolymer and be reacted.

(Aromatic Polyether Composition)

An aromatic polyether composition according to an aspect of the present invention includes an aromatic polyetherA.

In one embodiment, the aromatic polyether composition contains a filler.

The filler is preferably one or more selected from the group consisting of a glass fiber, a carbon fiber and boron nitride. In one embodiment, the filler is a glass fiber.

In one embodiment, the aromatic polyether composition may be a fibrous composite material including an aromatic polyether A as a matrix and a fibrous filler such as a glass fiber, a carbon fiber and the like. The fibrous composite material can be so-called fiber reinforced thermoplastics (FRTP).

The fibrous filler may be one treated with a sizing agent. By treating with a sizing agent, a fibrous filler can be bundled in a bundle. A fibrous filler treated with a sizing agent has a sizing agent adhered to the surface thereof. The sizing agent is not particularly limited, and examples thereof include an epoxy-based sizing agent, a urethane-based sizing agent, and a polyamide-based sizing agent. The aromatic polyetherA may also be used as a sizing agent. The sizing agent may be used alone, or two or more kinds thereof may be used in combination. As a fibrous filler, one without treatment of a sizing agent may be used.

In one embodiment, the filler is a filler having a reinforcing action on the aromatic polyether A. Here, "a filler having a reinforcing action on an aromatic polyether A" is a filler in which a tensile strength in the case that 43 parts by mass of a filler is uniformly contained in 100 parts by mass of an aromatic polyether A is larger than one in the case that a filler is not contained in an aromatic polyetherA. The tensile strength is measured by the method described in the Examples.

The amount of the filler in the aromatic polyether composition is not particularly limited.

In one embodiment, the amount of the filler in the aromatic polyether composition is, for example, 5 parts by mass or more, 10 parts by mass or more, or 20 parts by mass or more, and is 60 parts by mass or less, 55 parts by mass or less, or 50 parts by mass or less, based on 100 parts by mass of the aromatic polyetherA. The upper limit and the lower limit can be arbitrarily combined.

The aromatic polyether composition may include other components than the aromatic polyether A and the filler. Other components are not particularly limited, and examples thereof include other resins that are not aromatic polyether A. Examples of the other resin include a fluororesin such as polytetrafluoroethylene and the like. Other components may be used alone, or two or more kinds thereof may be used in combination.

In one embodiment, 50% by mass or more, 60% by mass or more, 70% by mass or more, 80% by mass or more, 90% by mass or more, 95% by mass or more, 97% by mass or more, 99% by mass or more, 99.5% by mass or more, or substantially 100% by mass of the aromatic polyether composition consists of the aromatic polyether A, the aromatic polyether A and the filler, the aromatic polyether A and other components described above or the aromatic polyetherA, the filler and other components described above.

When it is "substantially 100% by mass", it may contain unavoidable impurities.

The method of preparing the aromatic polyether composition is not particularly limited, and examples thereof include mixing by using a known mixer and melt-kneading by using an extruder or the like. A filler may be side-fed into the aromatic polyetherA using a biaxial kneader.

A pellet of the aromatic polyether composition may be produced. The pellet can be used as a raw material for producing a molded body.

In one embodiment, a method for producing a pellet contains briefly cutting a fibrous filler into a chopped form (also referred to as a "short fiber") and then adding the aromatic polyether A to the short fiber. By mixing and granulating the short fiber and the aromatic polyether A, the pellet (also referred to as "short fiber pellets") can be produced.

In one embodiment, a method for producing a pellet contains immersing and pultruding a roving of a fibrous filler in a molten aromatic polyether A, and then cutting it into a desired pellet length to produce a pellet (also referred to as a "long fiber pellet"). When the long fiber pellet is produced as described above, breakage of the fibrous filler can be suppressed.

By molding an aromatic polyether composition (which may be in the form of pellet described above), a molded body can be produced. A conventional method such as injection molding, extrusion molding, blow molding can be used for molding. Further, an aromatic polyether composition can be press-molded, and a conventional method such as a cold press method or a hot press method can be used. Further, it is also preferred to use an aromatic polyether composition as a resin composition for a 3D printer and to mold it by using a 3D printer.

(Sheet)

A sheet according to an aspect of the present invention includes a cloth and the aromatic polyetherA impregnated into the cloth. Similar to the case where a filler is contained in the aromatic polyetherA, the sheet exhibits excellent mechanical strength.

The cloth is not particularly limited, and a cloth containing the fiber may be used. In one embodiment, the cloth is composed of fibers arranged in a plane. The cloth may be, for example, a woven fabric, a nonwoven fabric, a unidirectional material (also referred to as a "UD material").

The unidirectional material is composed of fibers aligned in one direction.

The fiber contained in the cloth is not particularly limited. It is preferable that the cloth contain one or more selected from the group consisting of a glass fiber and a carbon fiber. In one embodiment, the cloth contains a glass fiber.

In one embodiment, the sheet may be a fibrous composite material including an aromatic polyether A as a matrix and a fibrous filler such as a glass fiber, a carbon fiber and the like. The fibrous composite can be so-called fiber reinforced thermoplastics (FRTP). For example, a unidirectional fiber reinforced plastic is obtained by using a unidirectional material as the cloth.

In the sheet according to one embodiment, an aromatic polyether A is impregnated among the fibers contained in the cloth. The cloth may be a single cloth or a laminate formed by laminating two or more cloths. When the cloth is a laminate, the aromatic polyether A may also contribute to binding between the cloths.

The sheet may include other components in addition to the aromatic polyether A and the cloth. As other components, those described above for the aromatic polyether composition can be used.

In one embodiment, 50% by mass or more, 60% by mass or more, 70% by mass or more, 80% by mass or more, 90% by mass or more, 95% by mass or more, 97% by mass or more, 99% by mass or more, 99.5% by mass or more, or substantially 100% by mass of the sheet consists of the aromatic polyetherA and the cloth or the aromatic polyetherA, the cloth and other components mentioned above.

When it is "substantially 100% by mass", it may contain unavoidable impurities.

The method for producing a sheet described above is not particularly limited.

In one embodiment, the method for producing a sheet includes immersing an aromatic polyether A in a cloth. In this case, for example, a solution obtained by dissolving an aromatic polyether A in an appropriate solvent, a mixture obtained by mixing an aromatic polyether A in an appropriate vehicle, or a melt of an aromatic polyether A can be applied to the carbon fiber and immersion.

In one embodiment, the method of production a sheet includes making a cloth by fibers bundled by using a sizing agent containing an aromatic polyetherA.

In one embodiment, a method for producing a sheet includes laminating a film including an aromatic polyetherA to the cloth and melt pressing it.

In one embodiment, a method for producing a sheet includes directly adding a powder of an aromatic polyetherA to the cloth and then melting the powder.

As described above, in the description relating to the method for producing a sheet, the cloth impregnated with the aromatic polyetherA may be a laminate described above.

In one embodiment, the sheet is planar over the entire surface thereof.

In one embodiment, the sheet is formed in the three-dimensional shape. When the shape of the sheet is "three-dimensional", it means that the sheet includes a curved portion (including a bent portion).

The method for producing a sheet with the three-dimensional shape is not particular limited.

In one embodiment, the method for producing a sheet with the three-dimensional shape includes impregnating a cloth having the three-dimensional shape with the aromatic polyetherA.

In one embodiment, a method for producing a sheet with the three-dimensional shape includes impregnating a cloth with an aromatic polyether A to obtain a sheet (e.g., a planar sheet), and then molding the sheet to have the three-dimensional shape. The molding can be performed, for example, by applying pressure to the sheet under heating.

As described above, in the description relating to the sheet, the aromatic polyether A may be impregnated into the cloth as an aromatic polyether composition according to an aspect of the present invention described above. In this case, the aromatic polyether composition may or may not include a filler.

(Application)

The application of the aromatic polyether A and the aromatic polyether composition being an aspect of the present invention is not particularly limited. The aromatic polyether A and the aromatic polyether composition are suitable as, for example, sliding members such as aerospace applications, gears, bearings, resins for 3D printers, various resin compositions.

The molded body containing the aromatic polyether A is suitable as industrial materials such as electric and electronic materials (connectors, printed circuit boards and the like), industrial structural materials, automobile parts (connectors for vehicle mounting, wheel caps, cylinder head covers and the like), household appliances, various mechanical parts, pipes, sheets, trays, and films.

EXAMPLES

Examples of the present invention will be described below, but the present invention is not limited by the Examples.

Example 1

Synthesis of Aromatic polyetherA-1

Compounds represented by formulas (1B) to (4B), wherein all of two X's in formula (1B) and two Z's in formula (2B) are Cl, were reacted to obtain an aromatic polyether A-1. Specifically, it was synthesized by the following method.

22.472 g (0.089 mol) of 4,4'-dichlorobenzophenone, 6.602 g (0.038 mol) of 2,6-dichlorobenzonitrile, 20.123 g (0.108 mol) of 4,4'-biphenol, 1.332 g (0.012 mol) of hydroquinone, 19.915 g (0.144 mol) of potassium carbonate and 160.01 g of diphenylsulfone were added to a 300 ml four necked flask equipped with a stirrer, a thermometer, a nitrogen introduction pipe and a water recovery vessel connected to a cooling pipe, and nitrogen gas was flowed therethrough.

After raising the temperature to 150° C., the temperature was raised to 210° C. over 30 minutes, and then it was maintained for 30 minutes. Next, the temperature was raised to 300° C. over 30 minutes, and then it was maintained for 30 minutes, and further, the temperature was raised to 340° C. over 30 minutes, and then it was maintained for 2 hours.

After completion of the reaction, the product was pulverized by a blender (manufactured by Warning Co., Ltd.) and washed with acetone and water in this order, and then dried in a dryer at 180° C., thereby obtaining a powdery aromatic polyetherA-1.

Example 2

Synthesis of Aromatic polyetherA-2

Compounds represented by formulas (1B) to (4B), wherein both of the two X's in formula (1B) are F and both of the two Z's in formula (2B) are Cl, were reacted to obtain an aromatic polyetherA-2. Specifically, it was synthesized by the following method.

19.799 g (0.091 mol) of 4,4'-difluorobenzophenone, 6.695 g (0.039 mol) of 2,6-dichlorobenzonitrile, 20.116 g (0.108 mol) of 4,4'-biphenol, 1.337 g (0.012 mol) of hydroquinone, 19.907 g (0.144 mol) of potassium carbonate and 160.01 g of diphenylsulfone were added to a 300 ml four necked flask equipped with a stirrer, a thermometer, a nitrogen introduction pipe and a water recovery vessel connected to a cooling pipe, and nitrogen gas was flowed therethrough.

After raising the temperature to 150° C., the temperature was raised to 210° C. over 30 minutes, and then it was maintained for 30 minutes. Next, the temperature was raised to 300° C. over 30 minutes, and then it was maintained for 30 minutes, and further, the temperature was raised to 340° C. over 30 minutes, and then it was maintained for 2 hours.

After completion of the reaction, the product was pulverized by a blender (manufactured by Warning Co., Ltd.) and washed with acetone and water in this order, and then dried in a dryer at 180° C., thereby obtaining a powdery aromatic polyetherA-2.

Comparative Example 1

Synthesis of Aromatic polyetherA'-1

Compounds represented by formulas (1B) to (3B), wherein all of two X's in formula (1B) and two Z's in formula (2B) are Cl, were reacted to obtain an aromatic polyetherA'-1. Specifically, it was synthesized by the following method.

22.800 g (0.091 mol) of 4,4'-dichlorobenzophenone, 6.701 g (0.039 mol) of 2,6-dichlorobenzonitrile, 22.355 g (0.120 mol) of 4,4'-biphenol, 19.904 g (0.144 mol) of potassium carbonate and 160.01 g of diphenylsulfone were added to a 300 ml four necked flask equipped with a stirrer, a thermometer, a nitrogen introduction pipe and a water recovery vessel connected to a cooling pipe, and nitrogen gas was flowed therethrough.

After raising the temperature to 150° C., the temperature was raised to 210° C. over 30 minutes, and then it was maintained for 30 minutes. Next, the temperature was raised to 300° C. over 30 minutes, and then it was maintained for 30 minutes, and further, the temperature was raised to 340° C. over 30 minutes, and then it was maintained for 2 hours.

After completion of the reaction, the product was pulverized by a blender (manufactured by Warning Co., Ltd.) and washed with acetone and water in this order, and then dried in a dryer at 180° C., thereby obtaining a powdery polyetherA'-1.

Evaluation Method (1) Melt Flow Rate (MFR)

The MFRs of the aromatic polyethers obtained in Examples and Comparative Example were measured using a melt indexer (L-227) manufactured by Tachiyama Science High Technologies Co., Ltd., in accordance with ASTM D 1238, at a resin temperature of 400° C. and a load of 2.16 kg.

(2) Thermal Characteristics

The glass transition temperature (Tg), the melting point (Tm) and the crystallization temperature (Tc) of the aromatic polyethers obtained in the Examples and Comparative Example were measured by using differential scanning calorimetry. The differences (Tm-Tc) between the melting point (Tm) and the crystallization temperature (Tc) were calculated. The measurement was conducted using the following procedure.

5 mg of the sample (aromatic polyether) was weighed into an aluminum pan, and temperature scanning measurement was conducted with a differential scanning calorimeter (DSC). The measurement was conducted in the following order: raising temperature from 20° C. to 420° C. at 20° C./min, falling temperature from 420° C. to 20° C. at −20° C./min, and raising temperature from 20° C. to 420° C. at 20° C./min. Among these, the exothermic peak of crystallization observed in falling temperature was obtained to determine the crystallization temperature (Tc). The endothermic peak of melting observed in second raising temperature was obtained to determine the melting point (Tm). In addition, the glass transition temperature (Tg) was obtained using the change point of specific heat capacity. “DSC8500” manufactured by PerkinElmer, Inc. was used for the above measurements.

(3) Cl and F Amounts

The Cl and F amounts of the aromatic polyethers obtained in Examples and Comparative Example were measured by a combustion ion chromatography method. In the combustion ion chromatograph method, a sample is introduced into a combustion furnace, and burned in a combustion gas containing oxygen, and the generated gas is collected in an absorption liquid, and then the absorption liquid is separated and quantified by an ion chromatograph. Quantitative values were obtained based on a calibration curve prepared using a reference of known concentrations. The quantitative values are a value mol-converted using the atomic weight of Cl as 35.5 and a value mol-converted using the atomic weight of F as 19.0. The measurement conditions are shown below.

<Sample Burning>

Combustor: AQF-2100H manufactured by Mitsubishi Chemical Analytech Co., Ltd.

Combustion furnace preset temperature: 800° C. for the first stage, and 1100° C. for the second stage Argon flow rate: 400 mL/min Oxygen flow rate: 200 mL/min Absorption liquid: aqueous hydrogen peroxide <Ion Chromatograph>

Analyzer: Integrion manufactured by Thermo Fisher Scientific Inc.

Columns: using in conjunction with (Dionex lonPac AG12A) as a guard column and (Dionex lonPac AS12A) as a separation column (both columns manufactured by DIONEX corporation)

Eluent: $Na_2CO_3$ (2.7 mmol/L)+NaHCO (0.3 mmol/L)

Flow rate: 1.5 mL/min

Column temperature: 30° C.

Measurement mode: suppressor method

Detector: electrical conductivity detector (4) K Amount

The K amount of the aromatic polyethers obtained in Examples and Comparative Example was measured by using inductively coupled plasma (ICP) emission spectrometry.

Specifically, 1 g of a sample (aromatic polyether) was collected in a platinum dish, and concentrated sulfuric acid was added thereto and then they were heated to carbonize-treat, and next, they were placed in an electric furnace and subjected to an ashing treatment at 550° C. for 12 hours. Thereafter, 2 ml of hydrochloric acid was added to the sample, and they were subjected to heat treatment, and after cooling, they were diluted up to 10 ml with ultrapure water to obtain a solution for measurement. In addition, a reference solution having a known concentration in which the hydrochloric acid concentration was made identical to that of the solution for measurement was also prepared.

The K amount was determined for the obtained solution by using ICP emission spectrometry (766.491 nm). A quantitative value was obtained based on a calibration curve prepared using a reference of known concentrations. The quantitative value is a value mol-converted using the atomic weight of K as 39.

(5) Reinforcement with Filler

For each of the aromatic polyethers obtained in the Examples and Comparative Example, 100 parts by mass of an aromatic polyether and 43 parts by mass of a filler (a glass fiber; “T-786H” manufactured by Nippon Electric Glass Co., Ltd., average fiber diameter: 10 μm, average fiber length: 3.0 mm) were kneaded using Plasti-Corder manufactured by Brabender Gmbh & Co. KG, for 5 minutes at 400° C. to obtain an aromatic polyether composition.

The obtained aromatic polyether composition was press-molded to have the thickness of 2 mm at 400° C. using a vacuum press manufactured by Imoto machinery Co., Ltd., and annealed at 200° C. to obtain a press-molded plate. The press-molded plate was cut into a dumbbell-shaped 5A type defined in JIS K7161 to obtain a test piece. The obtained test piece is subjected to a tensile test at 5 mm/min of test speed and 50 mm of distance chucks to measure the tensile strength.

The above results are shown in Table 1. In Table 1, "*" of the F amount means less than the lower limit of quantitation (<0.3 μmol/g).

TABLE 1

| | | Example 1 | Example 2 | Comparative Example 1 |
|---|---|---|---|---|
| Aromatic polyether | | A-1 | A-2 | A'-1 |
| MFR [g/10 min] | | 22 | 19 | 29 |
| Thermal characteristics | Tg [° C.] | 175 | 176 | 175 |
| | Tm [° C.] | 351 | 362 | 362 |
| | Tc [° C.] | 249 | 308 | 311 |
| | Tm-Tc [° C.] | 102 | 54 | 51 |
| Cl amount [μ mol/g] | | 48 | 3 | 85 |
| F amount [μ mol/g] | | * | 132 | * |
| K amount [μ mol/g] | | 3 | 6 | 2 |
| Tensile strength [MPa] (In the case that a filler is contained) | | 95 | 66 | 37 |

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The invention claimed is:

1. An aromatic polyether comprising structural units represented by the following formulas (1A) to (4A):

(1A)

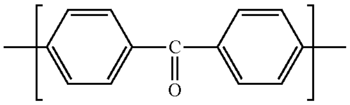

(2A)

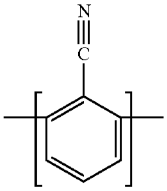

(3A)

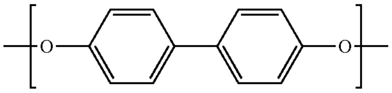

(4A)

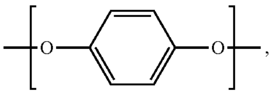

, wherein the difference (Tm-Tc) between the melting point (Tm) and the crystallization temperature (Tc) of the aromatic polyether is 55° C. or more.

2. The aromatic polyether according to claim 1, wherein a molar ratio ([1A]: [2A]) of the structural unit represented by the formula (1A) and the structural unit represented by the formula (2A) is 99:1 to 1:99.

3. The aromatic polyether according to claim 1, wherein a molar ratio ([3A]: [4A]) of the structural unit represented by the formula (3A) and the structural unit represented by the formula (4A) is 99:1 to 1:99.

4. The aromatic polyether according to claim 1, wherein the melt flow rate is 0.2 to 110 g/10 min.

5. An aromatic polyether composition comprising an aromatic polyether according to claim 1.

6. The aromatic polyether composition according to claim 5, which comprises a filler.

7. The aromatic polyether composition according to claim 6, wherein the filler is one or more selected from the group consisting of a glass fiber, a carbon fiber and a boron nitride.

8. The aromatic polyether composition according to claim 6, wherein the filler is a glass fiber.

9. A sheet comprising a cloth and the aromatic polyether according to claim 1 impregnated into the cloth.

10. The sheet according to claim 9, wherein the cloth is a unidirectional member.

11. The sheet according to claim 9, wherein the cloth comprises one or more selected from the group consisting of a glass fiber and a carbon fiber.

12. A method for producing an aromatic polyether comprising reacting compounds represented by the following formulas (1B) to (4B):

(1B)

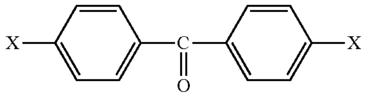

(2B)

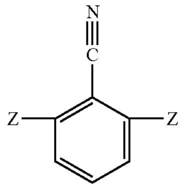

(3B)

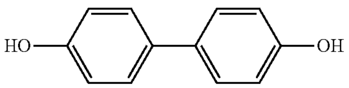

(4B)

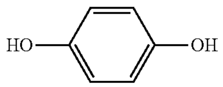

wherein in the formula (1B), X represents C1;

in the formula (2B), Z represents a halogen atom, the two Z's are the same as or different from each other.

* * * * *